US 6,526,043 B1

(12) United States Patent
Fogelholm et al.

(10) Patent No.: US 6,526,043 B1
(45) Date of Patent: Feb. 25, 2003

(54) METHOD AND APPARATUS FOR CHARGING FOR AN OUTGOING VOICE CALL PERFORMED DURING AN INTERNET SESSION

(75) Inventors: Rabbe Fogelholm, Sollentuna (SE); Johan Svedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/301,185

(22) Filed: Apr. 28, 1999

Related U.S. Application Data

(63) Continuation of application No. PCT/SE97/10795, filed on Oct. 28, 1997.

(30) Foreign Application Priority Data

Oct. 28, 1996 (SE) ................................. 9603932

(51) Int. Cl.$^7$ ..................... H04L 12/28; H04M 11/00; H04M 15/00
(52) U.S. Cl. .................. 370/352; 370/389; 370/401; 379/88.17; 379/114
(58) Field of Search ................. 370/352, 353, 370/354, 389, 392, 401; 379/88.17, 91.01, 93.01, 93.09, 100.03, 100.04, 100.15, 112, 113, 114, 115, 133

(56) References Cited

U.S. PATENT DOCUMENTS

| | | | | |
|---|---|---|---|---|
| 5,608,786 A | * | 3/1997 | Gordon ...................... | 379/100 |
| 5,805,587 A | * | 9/1998 | Norris et al. ............... | 370/352 |
| 5,905,736 A | * | 5/1999 | Ronen et al. ............... | 370/546 |
| 5,956,391 A | * | 9/1999 | Melen et al. ............... | 379/114 |
| 5,982,774 A | * | 11/1999 | Foladare et al. ............ | 370/401 |
| 6,069,890 A | * | 5/2000 | White et al. ................ | 370/352 |
| 6,125,113 A | * | 9/2000 | Farris et al. ................ | 370/389 |
| 6,137,869 A | * | 10/2000 | Voit et al. ................... | 379/114 |

FOREIGN PATENT DOCUMENTS

| | | |
|---|---|---|
| EP | 0 706 279 | 4/1996 |
| SE | 506 775 | 6/1999 |
| WO | 96/37848 | 11/1996 |
| WO | 96/38018 | 11/1996 |
| WO | 97/01920 | 1/1997 |

OTHER PUBLICATIONS

Muller, N., "1–800–INTERNET, with new software, you can talk business over the Net and avoid long–distance charges", *Byte*, vol. 21, No. 2, Feb. 1996, pp 83–88.

* cited by examiner

*Primary Examiner*—Alpus H. Hsu

(57) ABSTRACT

A method and an apparatus solve the problem of how to be able to charge for an outgoing voice call placed by a subscriber who is simultaneously performing an internet session. The problem is solved by creating a table and associating the IP-address, which ordered the call, with the duration and the destination of the call.

13 Claims, 4 Drawing Sheets

METHOD AND APPARATUS FOR CHARGING FOR AN OUTGOING VOICE CALL PERFORMED DURING AN INTERNET SESSION

This is a continuation of PCT/SE97/10795, filed Oct. 28, 1997.

The present invention relates to Internet and telecommunication in general and to charging in particular.

BACKGROUND

A telephone user, hereafter called a subscriber, may, by using a modem, connect to an ISP (Internet Service Provider) and thus get access to the Internet through his regular voice telephone. The drawback is that while the subscriber is using his internet account (surfing) his phone is busy and therefore anyone dialling to the subscriber will get a busy-tone. This can be solved as described in the Swedish application SE-9602212-4 by forwarding calls directed to the subscriber to a voice gateway. The voice gateway handles the translation between voice and internet and the subscriber will receive a message indicating a waiting voice call and can connect to the calling party using state-of-the-art voice-over-internet technology. This way the subscriber may simultaneously be connected to the internet and use his voice phone.

The subscriber may also place an outgoing call through the voice gateway in a similar manner. For a deeper description of the above mentioned ideas please refer to SE-9602212-4.

When the subscriber places a voice call using the voice gateway, it seems, from the network operators point of view as if the voice gateway made the call and thus should be charged for the call. This is of course not acceptable but is not solved in the related art.

The present invention disclose a method and a apparatus for solving the problem with how to be able to charge for an outgoing voice call placed by a subscriber who is simultaneously performing an internet session.

The purpose of the present invention is thus to be able to charge for an outgoing voice call, placed by a subscriber during an internet session.

The problem, described above, regarding how to charge a subscriber for an outgoing call placed during an ongoing internet session is solved by in a call record associate the destination and duration of the outgoing call with the user. This association can be based on the users A-number, user-id, Ip-adress etc.

DETAILED DESCRIPTION

I the following description, for purposes of explanation and not limitation, specific details are set forth, in order to provide a thorough understanding of the present invention. However, it will be apparent to one skilled in the art that the present invention may be practised in other embodiments that depart from these specific details. In other instances, detailed descriptions of well known methods, devices, and circuits are omitted so as not to obscure the description of the present invention with unnecessary detail.

Figure 1:
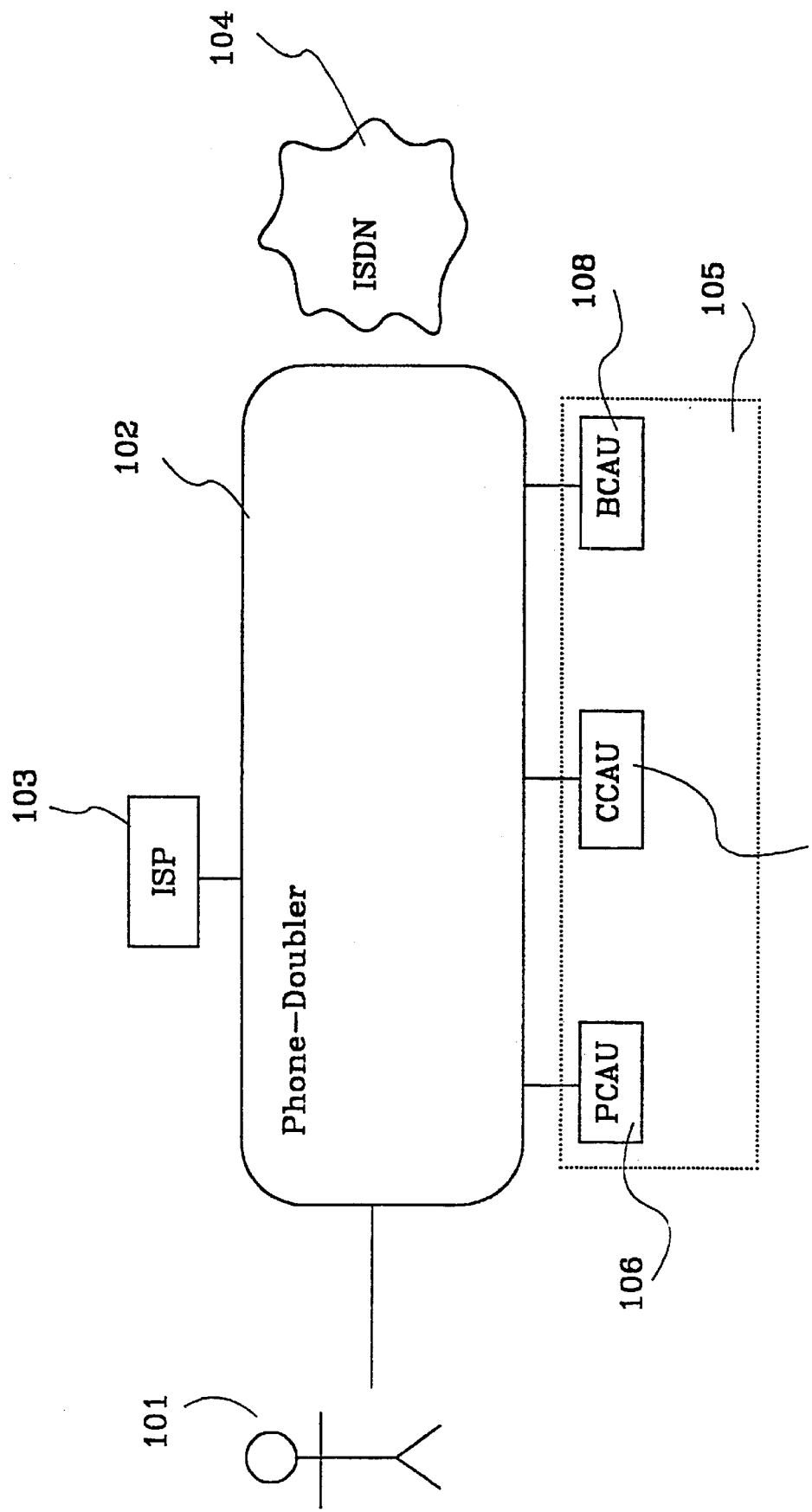
FIG. 1 shows in overview a logical network model.

In FIG. 1 is a general overview of the surroundings of the network and how the phone-doubler interfaces with its neighbours. A user 101 is connected to the phone-doubler 102 is also connected to the ISP (Internet Service Provider) 103, and to the ISDN (Integrated Services Digital Network) 104 and to ISP-adaptations 105. Such adaptations could for instance be a PCAU (PSTN Control Adaptation Unit) 106. The PCAU 106 is a unit that mediates between n phone-doubler 102 and the network operators PSTN network, for the purpose of activation and deactivation of call diversions. Call diversion is an integral part of the workings of the phone-doubler. Another adaptation unit can be a CCAU (Customer Care Adaptation Unit) 107, which is a unit that mediates between phone-doubler 102 and the customer care system of the ISP. The last adaptation unit shown in FIG. 1 is the BCAU (Billing Centre Adaptation Unit) 108, which is a unit that mediates between phone-doubler 102 and the billing centre of the ISP.

Figure 2:
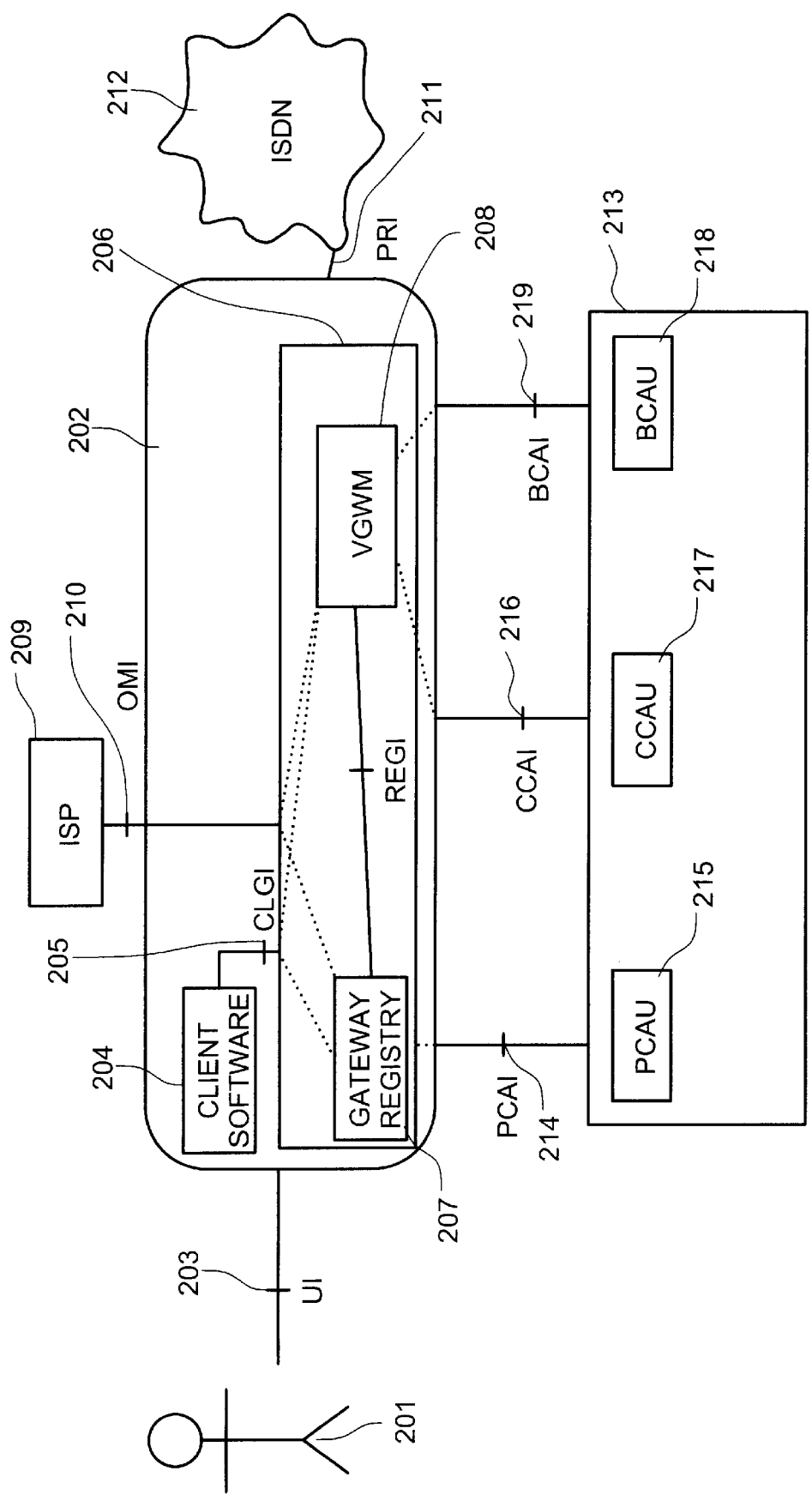
FIG. 2 shows in more detail the phone-doubler and its interfaces.

In FIG. 2 a more detailed description of the inner working of the phone-doubler and its interfaces is shown. The user 201 is still present and is utilising the phone-doubler 202 through an UI (User Interface) 203. The UI could for instance be a Microsoft Windows application giving the user a windows user interface for handling the phone-doubler services. The user is using a client software 204 which could be the just mentioned windows application handling the communication with the gateway 206 over a CLGI (Client Gateway Interface) 205. The gateway 206 is located on the ISP 209 premises. The gateway 206 can be located at different geographical locations. The gateway 206 comprises a gateway registry 207 which is common to all subscribers to the phone-doubler services, and at least one VGWM (Voice GateWay Module) 208. The VGWM 208 processes the call and speech transmissions and can handle several calls simultaneous.

The ISP has for operation and maintenance a OMI (Operation and Maintenance Interface) 210 to the phone-doubler 202. An PRI (Primary Rate Interface) 211 connects the phone-doubler 202 with the ISDN 212.

For communication between the phone-doubler 202 and the ISP-adaptations 213 a number of different interfaces are used. PCAI (PSTN Control Adaptation Interface) 214 for communication with PCAU 215, CCAI (Customer Care Adaptation Interface) 216 for communication with CCAU 217 and BCAI (Billing Centre Adaptation Interface) for communication with BCAU 218.

Figure 3:
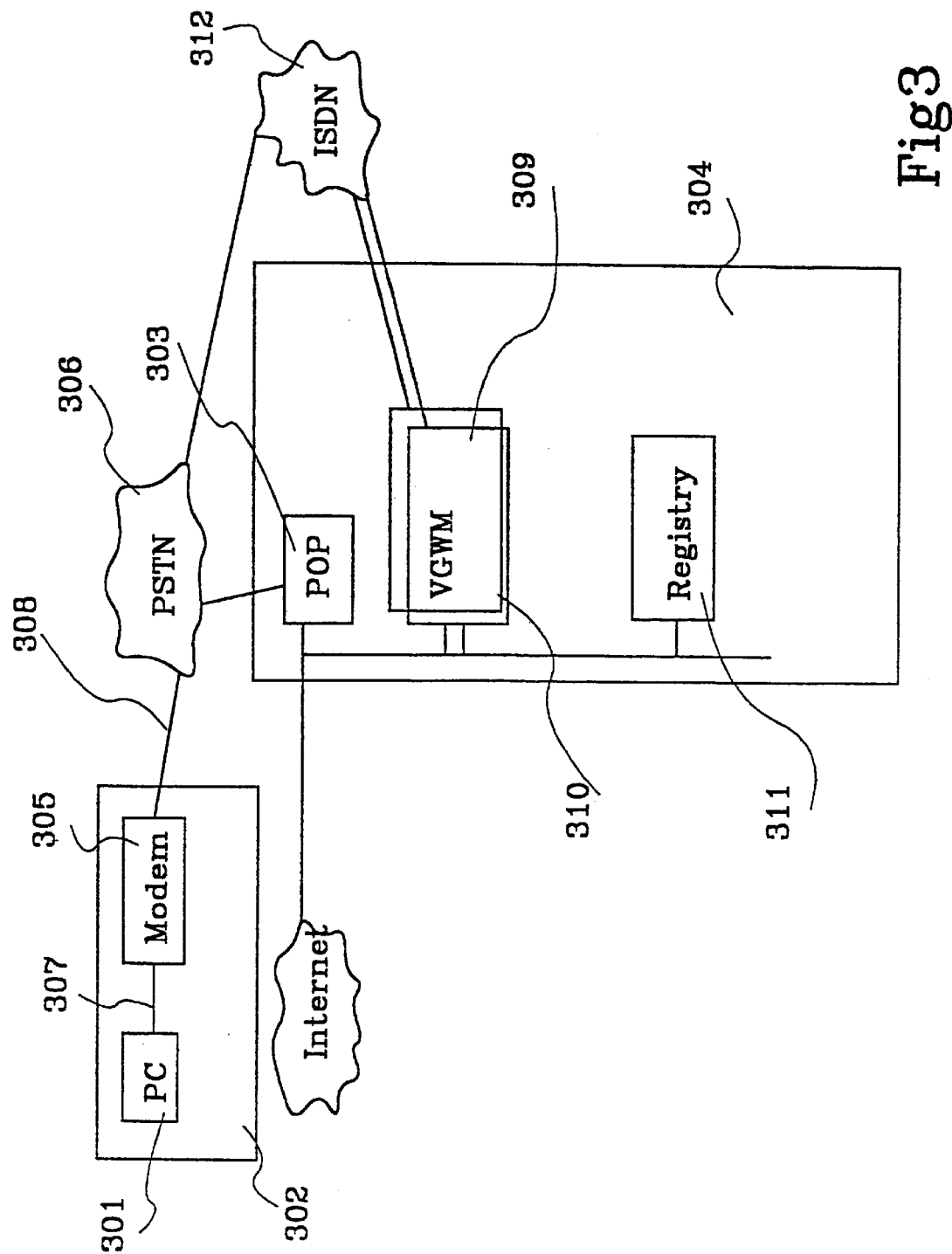
FIG. 3 displays a physical network model.

The client 204 is running on a PC (Personal Computer) 301 in FIG. 3, located at the users premises 302 and connected to the ISP's POP (Point Of Presence) 303, at the ISP's premises 304 via a modem 305 and PSTN 306. The PC 301 is given an IP-address 307 by the ISP. This is normally done dynamically when connecting to the POP 303. The users normal telephone line 308 is used for connecting between the modem 305 and the PSTN 306.

One or several VGWM 309 is connected to the ISP's IP network 310, typically on the same switched Ethernet as the POP but not necessarily. Each VGWM 309 has its own IP-address, and the registry 311 may have an IP-address of its own, or share the IP-address of one of the VGWM's 309.

Each VGWM 309 is connected to ISDN 312 via PRI.

One registry node 311 can handle several VGWM 309. The registry node 311 can physically be remotely placed. An ISP can have one central registry node 311 and several distributed VGWM 309.

The client 204 in FIG. 2 stores a number of different data items such as:
Country code
Area code (including trunk prefix)
Telephone number. (local number)
Service preferences
client IP address (volatile)
Hostname of registry
VGWM IP address (volatile)
ISDN number to VGWM cluster (this may be a group number)
Reject incoming calls (volatile, settable from the GUI)

The combination of country code, area code, and local number identifies each subscriber uniquely.

The VGWM IP address attribute also represents the state of the client: A null address indicates that the client is signed-off from the phone-doubler service, any other address indicates that the client is signed-on.

The registry 311 holds a subscriber record for each client, where each record comprises the following attributes:
telephone number (key, persistent, made up from country code, area code, and local number)
password (persistent, stored with a one-way function encryption)
client IP address (secondary key, volatile)
user id (persistent)
service preferences (persistent)
number of sign-on (persistent)
number of incoming calls (persistent)
number of outgoing calls (persistent)
first sign-on (persistent)
last sign-on (persistent)

The client IP address attribute also represents the state of the subscriber record, a null IP address states that the client 204 is signed-off, any other address states that the client 204 is signed-on.

When a user 201 is connected to the Internet, the IP address of the client 307 is entered into the subscriber record. Since both the telephone number and this IP address are keys, an PSTN-to-IP association between the telephone number and IP address is maintained in the subscriber record.

Whenever an event occurs in the phone-doubler service relating to the registry, a record is created in the registry 311 and stored in the registry log. The registry log contains records of events, relating to the session that takes place between a sign-on and a sign-off. A registry log record is created when a subscriber record changes state to signed-off, or when a subscriber record is deleted. The registry log record comprises the following attributes:
Record id (sequence number)
Termination date (timestamp of session termination)
Client IP address
user id
User's telephone number
Sign-on date
Duration
Number of incoming calls
Number of outgoing calls
Termination code (indicating which normal event or exception that terminated the session)

The phone-doubler can have one or several VGWM's. Each of these VGWM's holds a record of each call or call attempt made through that particular VGWM. The call record may comprise the following attributes:
Record id (per-VGWM sequence number)
Date and time (timestamp of the completed log record)
Client IP address and port
User's telephone number
Direction (incoming or outgoing)
VGWM IP address and port
VGWM ISDN number
B-number (same as user's telephone number for incoming call)
Call set-up date and time
Duration
Sent packages
Received packages
Answer state. Answered, rejected or not answered
Termination reason. User, client, ISDN or VGWM.

To be able to achieve a connection between an outgoing call from the VGWM 309 and the user 201 for the purpose of charging the user 201 for the call, the users telephone number 308 can be picked up by the POP 303 and transferred to the VGWM 309. The VGWM-will store the A-number in a call record in the call log. The call log will then be sent to the post-processing system of the ISP and possibly incorporated in the users 201 telephone bill.

If, for one reason or another, a secure A-number can not be picked up by the POP 303, the user 201 could be enabled to state his A-number by himself. This introduces, however a risk of fraud, for instance if one phone-doubler user states the A-number of another phone-doubler user, the second phone-doubler user would be charged for the outgoing calls placed by the first phone-doubler user. This can be solved by also requiring a that the A-number is accompanied with a personal password. That is, when a user 201 signs-on, he has to state his A-number together with a password. The registry 207 handles the authentication of the password and if the authentication was good the A-number is stored in the registry 207 log.

To even more increase the security, the A-number could be verified by a call-back procedure. This means that the phone-doubler calls the user , after the user has signed-on to verify the A-number the user stated in the sign-on procedure. Different schemes can be used for achieving this without too much work for the user 201, for instance can the registry 207 detect a new user at the initial sign-on, where the user 201 states his password and A-number. The registry 207 asks the user 201 to finish his internet session, connect an ordinary telephone set to his line, dial the VGWM 208 and hang up. The VGWM 208 picks up the A-number presented in the call and hand it over to the registry 207, which unlocks the subscriber record for this A-number.

In another preferred embodiment the charging of outgoing calls is instead based on the IP-number of the user. For each call log record in the VGWM 309 which comprises a successful outgoing call find the identity of the user 201 who made the call. This can be achieved by comparing the POP 303 log for the record of an internet session with the same IP-number as that of the call record in the VGWM 309 and a time span that encompasses that of the outgoing call. The internet user 201 is then charged according to the dialled B-number and the duration of the call. The amount due is added to the users 201 internet bill. The comparison between the VGWM 309 call records and the POP 303 log can be done at the ISP's post-processing system.

In another preferred embodiment the user 201 is authenticated by the registry 207 with a user-id and a password.

When the user 201 wants to place an outgoing call the client 204 establishes contact with the registry 207 submitting the requested B-number. The registry authenticate the user 201 and selects an appropriate VGWM 208 for handling the outgoing call. The VGWM creates a call record based on the user-id transmitted by the registry 207 to the VGWM 208. The user can then be charged on the normal Internet account using the ISP's 209 post-processing system and the call record in the VGWM 208. In this preferred embodiment it is, thus, the registry 207 which handles the authentication and no direct contact between the client 204 and the VGWM 208 is necessary.

Figure 4:
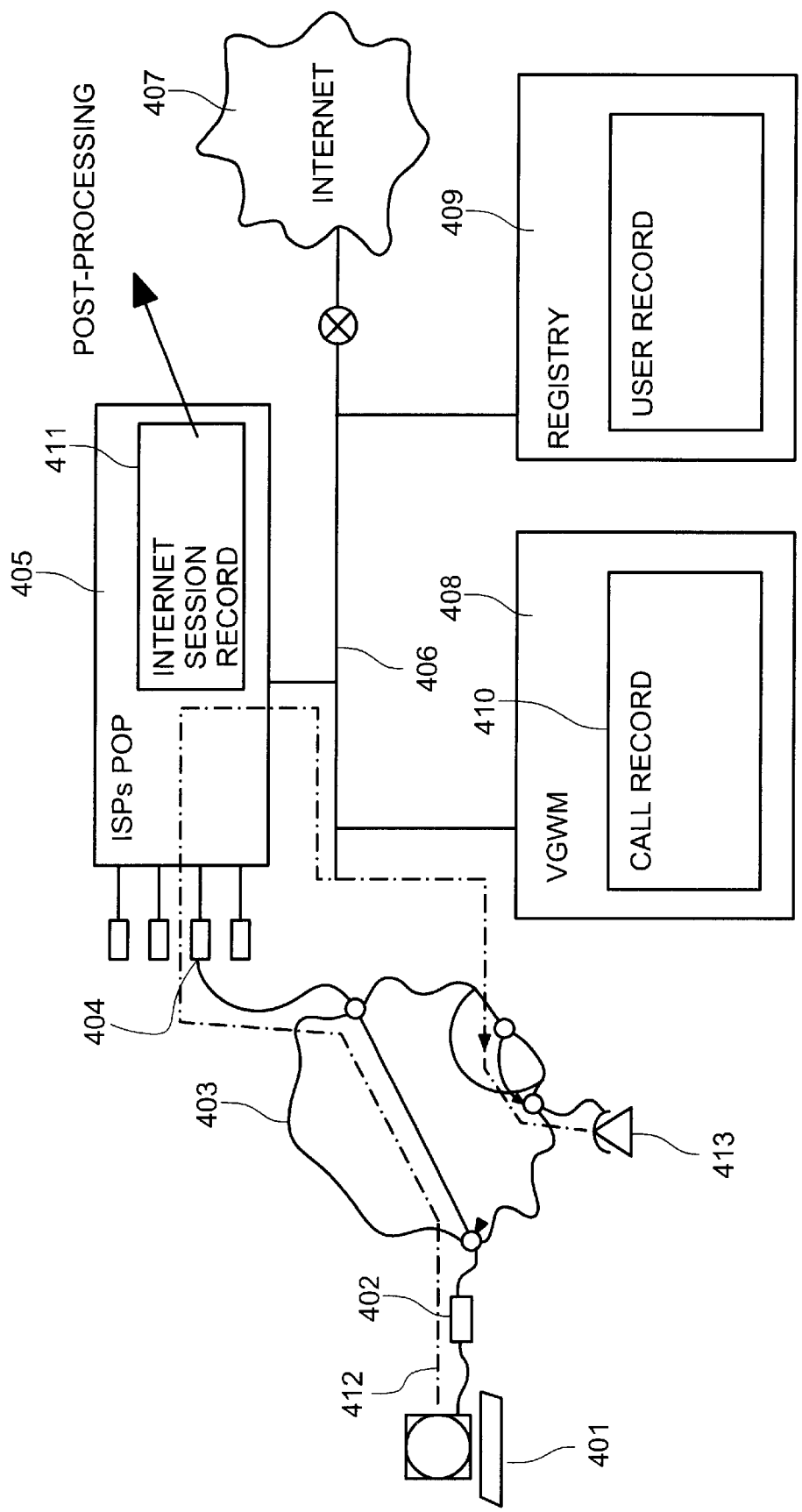
FIG. 4 shows an overview of a preferred embodiment according to the invention.

In FIG. 4 a user with a client is referred to as 401. The user 401 is connected to Internet 407 via a first modem 402, the PSTN network 403, a second modem 404 at the ISP, the ISP's POP 405 and through the ISP LAN 406. The ISP has for each Internet account a specific session record 411 identifying the data for the Internet sessions, such as for instance duration. When the user 401 wants to place an outgoing call, the client 401 take contact with, in one preferred embodiment the VGWM 408, and in another preferred embodiment the registry 409. An authentication procedure further described above takes place and the VGWM 408 calls the requested subscriber 413. The VGWM records the specifics about the call in a call record 410. If the subscriber 413 answers the phone, a call 412 is set-up from the user 401 to the subscriber 413 via the VGWM 408. The call is transported on a IP-based network from the user 401 to the VGWM 408 and on a traditional telecom network from the VGWM 408 to the subscriber 413. After the call 412 is finished the call record in the VGWM 408 is completed. The ISP collects the call records 410 together with the session records 411 and can by using a post-processing system charge the user 401 for the outgoing calls by identifying the user 401 either by user-id, IP-adress, A-number etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of charging a subscriber for an outgoing voice call to a called party, the outgoing voice call being placed via a computer which is simultaneously used for an Internet session, the outgoing voice call being transmitted between the computer and the called party via a Voice Gateway Module (VGWM), the method comprising the steps of:

establishing, in the VGWM, an association between the subscriber and the outgoing voice call, thereby enabling the subscriber to be charged for the outgoing voice call;

establishing a cost for the outgoing voice call; and charging the subscriber, according to the established association, with the cost;

wherein an IP-address is associated with the subscriber during the Internet sessions, the IP-address being stored in an Internet session record:

the step of establishing comprises transferring the IP-address to the VGWM and storing the IP-address in a call record in the VGWM;

the association between the subscriber and the outgoing voice call consists of an association between the IP-address and the outgoing voice call; and the step of charging comprises processing said call record and said Internet session record; and the step of charging further comprises adding the cost to an Internet bill of the subscriber.

2. The method according to claim 1, wherein the step of establishing an association includes establishing an association between the outgoing voice call and a billing identity of the subscriber, wherein the billing identity includes at least one of a subscriber telephone number and a subscriber IP-address.

3. A method according to claim 1, wherein:

the step of establishing an association comprises receiving, in the VGWM, the telephone number of the subscriber, the association including an association between the telephone number and the outgoing voice call; and the step of charging comprises adding the cost to a telephone bill associated with the telephone number.

4. A method according to claim 3, wherein the telephone number is received automatically.

5. A method according to claim 3, wherein the telephone number and a password are entered manually by the subscriber.

6. A method according to claim 1, wherein the subscriber is authenticated, in a registry connected to the VGWM, by use of a user-id and a password;

the step of establishing an association comprises transferring, to the VGWM, the user-id of the subscriber, the association consisting of an association between the user-id and the outgoing voice call.

7. A method according to claim 1, wherein the step of establishing a cost comprises recording and storing, in a call record in the VGWM, at least the telephone number of the called party and the duration of the outgoing voice call.

8. An apparatus for charging a subscriber for an outgoing voice call to a called party, the outgoing voice call being placed via a computer which is simultaneously used for an Internet session, the outgoing voice call being transmitted between the computer and the called party via a Voice Gateway Module (VGWM), the apparatus comprising:

means for establishing, in the VGWM, an association between the subscriber and the outgoing voice call;

means for calculating the cost for the outgoing voice call; and means for charging, according to the established association, the subscriber with the cost;

means for associating an IP-address with the subscriber during the Internet session, means for uniquely identifying the subscriber based on the IP-address and means for storing the IP-address in an Internet session record; wherein the means for establishing an association comprises means for transferring the IP-address to the VGWM and means for storing the IP-address in a call record in the VGWM, the association including an association between the IP-address and the outgoing voice call; and the means for charging comprises means for processing the call record and the Internet record, and means for adding the cost to an Internet bill of the subscriber.

9. An apparatus according to claim 8, wherein the means for establishing an association comprises means for receiving the telephone number of the subscriber, the association consisting of an association between the telephone number and the outgoing voice call; and the means for charging comprises means for adding the cost to a telephone bill of the subscriber.

10. An apparatus according to claim 9, wherein the means for receiving is capable of automatically receiving the telephone number.

11. A method according to claim 9, wherein the means for receiving is capable of receiving the telephone number and a password, the telephone number and password having been entered manually by the subscriber.

12. An apparatus according to claim 8, further comprising in a registry connected to the VGWM, means for authenticating the subscriber by use of a user-id and a password; the means for establishing an association comprises means for transferring, to the VGWM, the user-id of the subscriber, the association including an association between the user-id and the outgoing voice call.

13. An apparatus according to claim 8, wherein the means for calculating a cost comprises means for recording and storing, in a call record in the VGWM, at least the telephone number of the called party and the duration of the outgoing voice call.

* * * * *